United States Patent Office 2,906,021
Patented Sept. 29, 1959

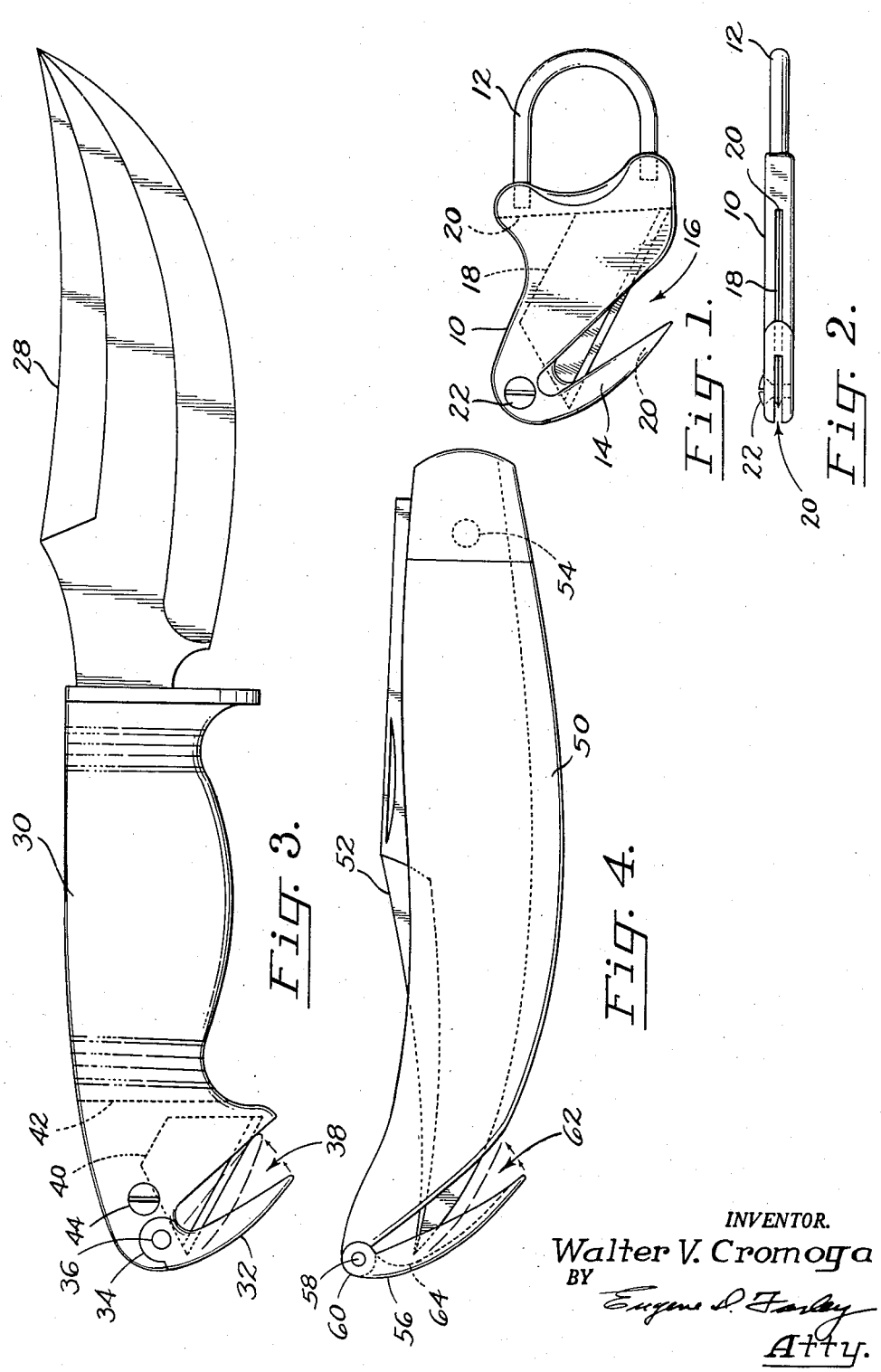

2,906,021

SKINNING KNIFE

Walter V. Cromoga, Tacoma, Wash.

Application February 1, 1957, Serial No. 637,828

1 Claim. (Cl. 30—293)

This invention relates to skinning knives.

The general object of the present invention is to provide a knife for use in skinning animals rapidly and easily and without mutilating the flesh or cutting into the intestines of the animal.

It is another object of this invention to provide a skinning knife which is self cleaning and does not become fouled with hair, flesh or pieces of skin.

It is another object of this invention to provide a skinning knife which can be sharpened easily.

It is another object of this invention to provide a skinning knife which is particularly adaptable for use in removing the skin from around the head, shanks, and other areas which normally are hard to skin.

It is another object of this invention to provide a skinning knife which protects the user from cutting himself.

The manner in which the foregoing and other objects of this invention are accomplished will be apparent from the accompanying specification and claims considered together with the drawings, wherein:

Fig. 1 is a plan view of the herein described skinning knife in a first embodiment;

Fig. 2 is a side elevation of the skinning knife of Fig. 1;

Fig. 3 is a plan view of the presently described skinning knife in a second embodiment; and Fig. 4 is a plan view of the skinning knife of my invention in still a third embodiment.

Generally stated, the skinning knife which I have invented comprises a handle, a guard attached to the handle and forming a jaw-like recess with the same, and a knife blade angularly mounted in the recess. Means may be provided for adjusting the span of the recess, for demountably fixing the blade in the handle, and for gripping the handle securely.

Considering the foregoing in greater detail and with particular reference to the drawings:

In the embodiment of Figs. 1 and 2, the skinning knife of my invention includes a handle portion or body 10 which may be formed from a flat piece of brass or other metal having a contour such that it is conveniently grasped in the hand. To facilitate holding it securely, it may be provided with a finger loop 12 dimensioned to receive the middle finger when the thumb and index fingers grip the opposite faces of the handle.

A guard member 14 is attached to the handle, preferably being formed integrally therewith. This member is dimensioned and directed in such a manner that it forms with the handle a jaw-like recess 16 adapted to receive the skin to be cut. A knife or razor blade 18 then is mounted on the handle in such a manner that its cutting edge extends angularly across the recess.

The knife angle is variable to suit the requirements of the user. Thus it may lie at an angle on one side of the recess as indicated in the drawings if it is desired to cut the skin from the hair side, or at an angle on the other side of the recess if it is desired to cut the skin from the flesh side, or at any intermediate angle.

Although the knife 18 may be mounted on the handle in any suitable manner, it preferably is mounted thereon by providing the handle and part of the guard member with a longitudinal cleft 20 which extends in the plane of the handle and receives blade 18 in the indicated manner. A screw 22 then may be threaded into tapped openings through the two separated parts of the handle, clamping the blade releasably in place, so that it may be removed easily for sharpening or replacement.

In the form of my invention illustrated in Fig. 3, the presently described skinning knife is illustrated mounted on the end of a hunting knife comprising a principal blade 28 and a handle 30. A guard-like projection 32 is pivotally connected to the end of handle 30 in a suitable manner, as for example, by means of spaced tabs 34, which receive a reduced portion of the handle end, and pin 36 extending therethrough. A tight fit is present between these members so that the position of guard 32 may be varied as required to define a jaw-like recess 38 of the desired dimensions.

An auxiliary or skinning knife blade 40 is mounted angularly across this recess. Preferably it is held in position by dividing the end of handle 30 to form a cleft 42 into which the blade may be inserted. A screw 44 then may be threaded into tapped openings in the two segments of the handle so that the blade may be held releasably in place in any desired angular position.

Still another form of my invention is illustrated in Fig. 4. In this embodiment, a single knife blade serves the dual functions of acting as a conventional knife blade and also as the cutting element of the herein described skinning knife.

Accordingly, the knife comprises a handle 50 which is shaped and dimensioned in somewhat the same manner as is a conventional pocket knife, but which is divided longitudinally to provide a cleft recess between two handle sections. A blade 52 is spring mounted in this cleft recess and pivots about a pin 54 in the usual manner. Accordingly the blade may lie in a closed position, as indicated in the drawing, or it may be extended to an open position when it is desired to use the knife for ordinary purposes.

A guard member 56 is pivoted to the end of handle 50 by means of a pin 58 extending through both a restricted portion of the handle and tabs 60 on the inner end of the guard. As in the embodiment of Fig. 3, a friction fit exists between these members so that the guard may be adjusted angularly to provide a jaw-like recess 62 of desired size.

Guard 56 is formed with a recess 64 and knife blade 52 is dimensioned to extend across jaw-like recess 62 and into recess 64 in the guard. In this manner an angularly disposed cutting edge is provided within the former which makes possible use of the implement as an efficient skinning tool.

The skinning knife of Figs. 1 and 2 is employed as follows: If it is desired to skin a deer, the animal is first hung by the hind legs from a support. Small openings are made in the skin circumferentially of the animal at spaced, selected locations. The skinning knife then is grasped with the thumb and index finger on opposite faces of handle 10 and the middle finger in loop 12.

The pointed end of guard member 20 is inserted in one of the openings in the skin and the knife drawn downwardly. Thereupon the arcuate outer surface of guard 20 serves as a runner along which the tool moves. It also serves as a guard, preventing the knife blade from coming in contact with the flesh immediately beneath the skin.

With continued motion of the tool, the cutting edge of knife blade 18 comes in contact with the skin and, working against the inner surface of guard 20, which serves as an effective bedplate, cuts through the skin easily and cleanly. When a cut of the desired length has been made, the point of the tool is inserted in another of the small openings through the skin and another cut made. This process is carried on until the skin has been cut into sections. Crosswise cuts then may be made across the skin in a similar manner and each section stripped from the flesh.

It will be understood that the inner surface of the guard 20 functions as a bed plate by virtue of the fact that the knife tends to be extracted from the skin as it is pulled along during the skinning operation. The toughness of the skin prevents such extraction, however, and hence the bedplate surface is maintained automatically at the inner surface of the skin.

The manner of operation of the skinning knives of Figs. 3 and 4 is analogous, excepting that guard 32 of the knife of Fig. 3 and guard 56 of the knife of Fig. 4 may be adjusted angularly to form a jaw opening of any desired size as required, for example, for skinning animals of different species, or closed completely for safety when the knife is being carried or stored.

Thus it will be apparent that by the present invention I have provided a safe skinning knife which can be used to skin an animal rapidly and efficiently in but a fraction of the time usually required. The skinning operation may be effectuated without mutilating the flesh or puncturing the intestines of the animal. Also, the knife blade may be incorporated in the handle of a hunting knife or pocket knife of conventional style, and may be easily adjusted in position, or removed entirely for sharpening or replacement.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

A skinning knife comprising a body portion having two longitudinal sections and having top, bottom and end portions, a finger loop projecting from one end of the body portion for pulling the knife in the direction of the loop, a guard member on the opposite end of the body portion having an inner bedplate surface spaced from the adjacent surface of the body portion, the spaced surfaces defining a jaw-like recess therebetween, the inner bedplate surface of the guard member extending obliquely outward toward the loop end of the body portion and functioning to engage the inner surface of skin as the knife is pulled along during the skinning operation, a knife blade mounted between the two longitudinal body sections and having a cutting edge projecting obliquely across the bedplate surface for slicing contact with skin, the knife blade being adjustable between the body sections for assuming variable angular positions relative to the bedplate surface, and fastening means frictionally clamping the knife blade between the body sections for holding the blade in selected angular cutting positions relative to the bedplate surface.

References Cited in the file of this patent

UNITED STATES PATENTS

| | | |
|---|---|---|
| 139,312 | Hastings | May 27, 1873 |
| 814,153 | Myer et al. | Mar. 6, 1906 |
| 1,065,863 | Carter | June 24, 1913 |
| 1,493,484 | Enholdt | May 13, 1924 |
| 1,553,449 | Kennedy | Sept. 15, 1925 |
| 1,821,716 | Kusiv | Sept. 1, 1931 |
| 1,879,851 | Kravitz | Sept. 27, 1932 |
| 2,266,916 | Steele | Dec. 23, 1941 |